(12) United States Patent
Fung et al.

(10) Patent No.: US 12,465,457 B2
(45) Date of Patent: Nov. 11, 2025

(54) SYSTEMS AND METHODS FOR GUIDING DENTAL TREATMENT UTILIZING MIXED REALITY

(71) Applicants: Joseph Bing Kong Fung, Toronto (CA); Darshanand Khusial, Mississauga (CA); Baliram Maraj, Farmington, CT (US)

(72) Inventors: Joseph Bing Kong Fung, Toronto (CA); Darshanand Khusial, Mississauga (CA); Baliram Maraj, Farmington, CT (US)

( * ) Notice: Subject to any disclaimer, the term of this patent is extended or adjusted under 35 U.S.C. 154(b) by 558 days.

(21) Appl. No.: 17/624,010

(22) PCT Filed: Jul. 1, 2020

(86) PCT No.: PCT/US2020/040457
§ 371 (c)(1),
(2) Date: Dec. 30, 2021

(87) PCT Pub. No.: WO2021/003245
PCT Pub. Date: Jan. 7, 2021

(65) Prior Publication Data
US 2022/0346911 A1    Nov. 3, 2022

Related U.S. Application Data

(60) Provisional application No. 62/869,281, filed on Jul. 1, 2019, provisional application No. 62/869,614, filed on Jul. 2, 2019.

(51) Int. Cl.
*A61C 7/00* (2006.01)
*A61C 7/02* (2006.01)
(Continued)

(52) U.S. Cl.
CPC ............ *A61C 7/002* (2013.01); *A61C 7/02* (2013.01); *A61C 7/08* (2013.01); *A61C 9/0053* (2013.01);
(Continued)

(58) Field of Classification Search
CPC .. A61C 7/002; A61C 7/02; A61C 7/08; A61C 9/0053; G01B 11/2518
See application file for complete search history.

(56) References Cited

U.S. PATENT DOCUMENTS 7,295,700 B2    11/2007  Schiller et al.
8,487,962 B2     7/2013  Quadling et al.
(Continued)

FOREIGN PATENT DOCUMENTS

CN    108056829 A    5/2018
EP      2745801 B1    2/2018
(Continued)

OTHER PUBLICATIONS

International Search Report and Written Opinion in corresponding PCT Application No. PCT/US2020/040457 mailed Sep. 30, 2020, 13 pages.
(Continued)

*Primary Examiner* — Nicholas D Lucchesi
(74) *Attorney, Agent, or Firm* — Barclay Damon LLP; Anthony P. Gangemi (57) ABSTRACT

Dental treatment can be provided by a system that overlays a treatment template on a patient's arch in mixed reality, enabling a practitioner to view a schematic of the dental treatment while administering the treatment itself. The system employs a physical guide which includes stabilizing pieces to hold the guide steady with respect to the area of the arch where treatment is being administered. When the physical guide is scanned, a virtual guide is produced, in
(Continued)

relation to which the treatment template can be defined. When the physical guide is installed on the patient, the virtual guide is aligned with the physical guide, thus aligning the template with the physical arch. With the physical guide firmly in place, the guides provide abundant feature points for reliable alignment which can be maintained even while practitioners and patient's readjust their positioning throughout a treatment, or in situations where the oral anatomy may not be visible to a mixed reality device.

20 Claims, 9 Drawing Sheets

(51) Int. Cl.
| | | |
|---|---|---|
| *A61C 7/08* | (2006.01) | |
| *A61C 9/00* | (2006.01) | |
| *G01B 11/25* | (2006.01) | |
| *G06T 11/00* | (2006.01) | |

(52) U.S. Cl.
CPC ......... *G01B 11/2518* (2013.01); *G06T 11/00* (2013.01); *G06T 2210/41* (2013.01)

(56) References Cited

U.S. PATENT DOCUMENTS

| | | |
|---|---|---|
| 8,873,813 B2 | 10/2014 | Tadayon et al. |
| 9,122,955 B2 | 9/2015 | Greenspan et al. |
| 9,402,565 B2 | 8/2016 | Finkelstein et al. |
| 9,773,196 B2 | 9/2017 | Sachs et al. |
| 10,222,619 B2 | 3/2019 | Yu |
| 10,373,380 B2 | 8/2019 | Kutliroff et al. |
| D870,765 S | 12/2019 | Georg et al. |
| 10,507,087 B2 | 12/2019 | Elbaz et al. |
| 10,779,917 B2 | 9/2020 | Lancelle et al. |
| 10,980,621 B2 | 4/2021 | Lancelle et al. |
| 11,083,552 B2 | 8/2021 | Lancelle et al. |
| 11,213,374 B2 | 1/2022 | Lancelle et al. |
| 2004/0197727 A1* | 10/2004 | Sachdeva ............... A61C 7/00 433/24 |
| 2006/0234179 A1* | 10/2006 | Wen ........................ A61C 7/00 433/6 |
| 2007/0211081 A1* | 9/2007 | Quadling ........... A61C 13/0004 345/632 |
| 2008/0110590 A1* | 5/2008 | Wandke ................. D04H 18/04 162/305 |
| 2008/0318179 A1* | 12/2008 | Liu ......................... A61C 7/00 433/24 |
| 2010/0086200 A1 | 4/2010 | Stankiewicz et al. |
| 2015/0238288 A1 | 8/2015 | Lorunser et al. |
| 2015/0296184 A1* | 10/2015 | Lindenberg ............. H04N 7/18 348/77 |
| 2017/0065379 A1 | 3/2017 | Cowburn et al. |
| 2017/0161592 A1 | 6/2017 | Su et al. |
| 2017/0273549 A1 | 9/2017 | Nazareth et al. |
| 2018/0110590 A1* | 4/2018 | Maraj .................... A61C 7/002 |
| 2018/0204332 A1 | 7/2018 | Salah et al. |
| 2018/0235739 A1 | 8/2018 | Jahn |
| 2019/0090985 A1* | 3/2019 | Jo ........................... A61C 7/002 |
| 2020/0081413 A1 | 3/2020 | Georg et al. |
| 2021/0366136 A1 | 11/2021 | Lancelle et al. |

FOREIGN PATENT DOCUMENTS

| | | |
|---|---|---|
| JP | 2003245289 A | 9/2003 |
| WO | 2018005884 A1 | 1/2018 |

OTHER PUBLICATIONS

Huang et al., Augmented reality (AR) and virtual reality (VR) applied in dentistry. The Kaohsiung Journal of Medical Sciences; Jan. 12, 2018; 6 pages.

Translation of Office Action in corresponding Japanese Application No. 314441 mailed Jun. 27, 2023, 5 pages.

Translation of Office Action in corresponding Chinese Application No. 202080061684.X, mailed Dec. 11, 2023, 9 pages.

Ma et al.; Augmented reality surgical navigation with accurate CBCT-patient registration for dental implant placement; Jun. 10, 2018; 12 pages.

\* cited by examiner

SYSTEMS AND METHODS FOR GUIDING DENTAL TREATMENT UTILIZING MIXED REALITY

CROSS REFERENCE TO RELATED APPLICATION(S)

This application is a national stage patent application filing of International Application No. PCT/US2020/040457, filed Jul. 1, 2020, which claims the benefit of U.S. Provisional Application Nos. 62/869,281, filed Jul. 1, 2019, and 62/869,614, filed Jul. 2, 2019, which are incorporated by reference as if disclosed herein in their entireties.

BACKGROUND

The majority of orthodontic treatment involves the movement of malpositioned teeth to desired locations within a patient's mouth. One common orthodontic treatment includes affixing small, slotted appliances, referred to as brackets, to the surface of a patient's teeth and then placing and securing an archwire in the bracket slots. To ensure the teeth move in the desired manner, the brackets must be accurately positioned. For example, if a bracket is located too near the incisal or occlusal surface of a tooth relative to the adjacent brackets, the final position of that tooth can be unduly intruded, while if the bracket is located too near the gingival surface relative to the adjacent brackets, the final position of that tooth can be unduly extruded.

Complicating the positioning of brackets, or any physical dental apparatus, is tooth visibility and accessibility. When teeth are severely crowded, accessing a tooth surface can be difficult. Further, loss of accessibility increases with each subsequent posterior tooth. Another problem is time, as the longer a patient sits in the dental chair, the more restless the patient can become, which can negatively affect physical dental apparatus placement accuracy.

Traditionally, in order to install physical dental apparatus, e.g., brackets, on a patient's dental arch, measurements are taken of each tooth to determine the correct position for each apparatus. Typically, these measurements are a naked eye approximation by the practitioner via a measuring tool or an external software program. The practitioner then manually places the physical dental apparatus. For brackets, this can mean application of individual brackets for each tooth on the patient's arch. While orthodontists are skilled with accurately placing the brackets, naked-eye placement tends to be limited to an accuracy of about +/−0.5 millimeters. Ideally, bracket positions do not change during treatment.

A solution specifically for lengthy placement time and imprecise manual bracket placement involves indirect bonding. Indirect bonding utilizes a dental impression or scan of the patient's dental arches to replicate a patient's dentition. A plurality of brackets are positioned as desired on the replicated dentition. A dental template, which is a replication of the patient's arch that can be overlaid on the patient's physical arch, is fabricated with the bracket positions so that when the dental templates with the brackets engages the patient's dental arch, the brackets are properly aligned at the desired location on the desired teeth.

In mixed/augmented reality, real world objects are recognized and augmented with computer graphics, sound, etc. to produce an illusion to the senses such as eyes or ears. For the visual illusion to be rendered realistically on 3D object(s), unique features are identified on the physical object(s). These features enable a computer to recognize and track the location, dimensions, and orientation of a physical object as it is moving through space. The location, dimensions, and orientation of the physical object in relation to the mixed reality device enables the rendering of a mixed reality object with computer graphics that seems realistic to a viewer.

As an example, to render a virtual bracket on a physical tooth, the distance of the tooth from the mixed reality device is computed. This determines the size of the virtual bracket. Next, the orientation of the tooth is determined. For the particular tooth, e.g., if it is on the upper or lower arch, this would determine the orientation of the virtual bracket. Then, depending on if the mixed reality device is positioned directly in front of the tooth or to the side, the virtual bracket may need to be rotated to produce the illusion of the virtual bracket at the desired location in physical space.

The features on a physical object which may be used to detect location, dimensions, and orientation in 3D space could be gathered using computer vision algorithms including, but not limited to, histogram of oriented gradients, canny edge detection, oriented FAST and rotated BRIEF, scale invariant feature transform (SIFT), speeded up robust features (SURF), and/or deep learning AI models for detecting features such as shapes and edges. These features could be used to aid in the alignment in a mixed reality environment of a patient's physical arch with, e.g., information displayed in a mixed reality device, e.g., a headset.

However, using raw 3D scans of a patient's arch or face for alignment therewith in a mixed reality environment encounters a number of issues. Features of the face are supple and flexible. This would cause alignment issues with respect to tooth/teeth. As an example, if alignment is relative to the nose and edge of the eyes, a squint may distort the alignment of the virtual dental treatment template. Further, a raw 3D scan may capture areas of the arch that are not visible to the mixed reality device in a particular orientation. An example of this would be the gingival margin. In this case, the mixed reality device may attempt to lock on to a larger portion than what is in its field of view, causing tracking and congruency/superimposition difficulties.

SUMMARY

Some embodiments of the present disclosure are directed to a system for providing dental treatment. In some embodiments, a mixed reality device, a physical guide, one or more scans of a portion of a patient's arch, physical representation of a patient's arch, the physical guide, or combinations thereof, and a non-transitory computer storage media coupled with a computing device and encoded with one or more computer programs for producing a virtual dental treatment template and applying the virtual dental treatment template to the patient's arch. In some embodiments, the one or more computer programs include software executing on a computer readable medium for scanning the patient's arch, physical representation of a patient's arch, the physical guide, or combinations thereof to produce the one or more scans and a virtual arch corresponding to the patient's arch, software executing on a computer readable medium for rendering a virtual guide, the virtual guide configured to occupy a predetermined position with respect to the virtual arch, software executing on a computer readable medium for positioning a virtual target on the virtual arch, the virtual guide, or a combination thereof, and producing a virtual dental treatment template disposed at a predetermined position with respect to the virtual arch, the virtual guide, or a combination thereof, software executing on a computer readable medium for rendering the virtual guide in the mixed reality device, software executing on a computer readable medium for identifying a superimposition between the virtual guide and the physical guide, software executing on a computer readable medium for maintaining the superimposition between the virtual guide and the physical guide in the mixed reality device, and software executing on a computer readable medium for rendering the virtual dental treatment template in the mixed reality device at a predetermined position with respect to the physical guide, the predetermined position with respect to the physical guide corresponding to the predetermined position with respect to the virtual arch, the virtual guide, or a combination thereof. In some embodiments, the one or more computer programs include software executing on a computer readable medium for identifying an alignment between a physical dental apparatus and the virtual dental apparatus, wherein alignment is identified by a change in color of the virtual dental treatment template, by a haptic feedback to a practitioner, by an auditory feedback to a practitioner, by a visual feedback to a practitioner, by feedback to a dental tool, or combinations thereof. In some embodiments, the one or more computer programs include software executing on a computer readable medium for identifying the one or more additional feature points on the virtual guide. In some embodiments, the one or more computer programs include software executing on a computer readable medium for identifying a superimposition of at least a portion of one or more additional feature points on the virtual guide and corresponding feature points on the physical guide in the mixed reality device.

In some embodiments, the physical guide includes one or more stabilizing pieces that are configured for reversible interference fit on the patient. In some embodiments, the one or more stabilizing pieces include a retainer corresponding to at least a portion of the patient's arch. In some embodiments, the retainer includes one or more open regions for receiving a physical dental apparatus. In some embodiments, the physical guide includes one or more guiding pieces, the one or more guiding pieces including a body positioned not to obscure the patient's arch when in use. In some embodiments, the physical guide and virtual guide include one or more additional feature points for confirming the superimposition between the virtual guide and the physical guide in the mixed reality device.

In some embodiments, the virtual target is a virtual dental apparatus, a grid, treatment diagram, status indicator, prior disposition of the patient's arch, current disposition of a patient's arch, estimated future disposition of a patient's arch, or combinations thereof. In some embodiments, the virtual dental apparatus includes a bracket, implant, reconstructed tooth, replacement tooth, alveolar ridge augmentation, alignment tray, aesthetic restoration, non-aesthetic restoration, or a combination thereof.

Some embodiments of the present disclosure are directed to a system for providing dental treatment. In some embodiments, the system includes a mixed reality device, a scanning device, a physical guide configured for reversible interference fit over a corresponding structure on a patient's physical arch, the physical guide including a guiding piece and one or more retainer portions corresponding to at least a portion of the patient's physical arch, wherein the one or more guiding pieces are positioned above the one or more retainer portions and include one or more recesses to accommodate a patient's tongue when in use, and a non-transitory computer storage media coupled with a computing device and encoded with one or more computer programs for rendering dental treatment in the mixed reality device. In some embodiments, the one or more computer programs include software executing on a computer readable medium for scanning the patient's physical arch or a physical representation thereof with the scanning device to produce a virtual arch, software executing on a computer readable medium for generating a virtual guide, the virtual guide including one or more virtual guiding pieces and one or more virtual retainer portions corresponding to at least a portion of the virtual arch, the virtual guide configured to occupy a predetermined position with respect to the virtual arch, software executing on a computer readable medium for positioning one or more virtual targets on the virtual arch, the virtual guide, or a combination thereof, to produce a virtual dental treatment template at a predetermined position with respect to the virtual arch, the virtual guide, or a combination thereof, software executing on a computer readable medium for identifying one or more additional feature points on the virtual guide, the one or more additional feature points including high-contrast spots, corners, blobs, t-junctions, curves, edges, markers, shapes, objects, colors, textures, patterns, images, fluorescent regions, QR-codes, or combinations thereof, software executing on a computer readable medium for rendering the virtual guide in the mixed reality device, software executing on a computer readable medium for identifying and maintaining a superimposition between at least some of the feature points on the virtual guide and corresponding feature points on the physical guide in the mixed reality device, and software executing on a computer readable medium for rendering the virtual dental treatment template in the mixed reality device at a predetermined position with respect to the physical guide, the predetermined position with respect to the physical guide corresponding to the predetermined position with respect to the virtual arch, the virtual guide, or a combination thereof. In some embodiments, the guiding piece is shaped and has a guide width corresponding to a width of the patient's physical arch, and corresponding feature points on the physical guide are substantially evenly distributed on the physical guide.

Some embodiments of the present disclosure are directed to a method for aligning a virtual dental treatment template with a physical arch in mixed reality. In some embodiments, the method includes scanning a patient's arch, physical representation of a patient's arch, a physical guide, or combinations thereof to produce a virtual arch, rendering a virtual guide in a structure editing tool, the virtual guide configured to occupy a predetermined position with respect to the virtual arch, positioning one or more virtual targets on the virtual arch, the virtual guide, or a combination thereof, to produce a virtual dental treatment template at a predetermined position with respect to the virtual arch, the virtual guide, or a combination thereof, providing a physical representation of the virtual guide to the patient's physical arch, rendering the virtual guide in a mixed reality device, identifying an alignment between the virtual guide and the physical representation of the virtual guide in the mixed reality device, and rendering the virtual dental treatment template in the mixed reality device at a predetermined position with respect to the physical representation, the predetermined position with respect to the physical representation corresponding to the predetermined position with respect to the virtual arch, the virtual guide, or a combination thereof. In some embodiments, the method includes placing one or more physical dental apparatus corresponding to the location of virtual targets on the virtual dental treatment template.

In some embodiments, the virtual guide includes one or more virtual stabilizing pieces. In some embodiments, the one or more virtual stabilizing pieces include a retainer corresponding to at least a portion of the patient's physical arch. In some embodiments, the virtual guide includes one or more virtual guiding pieces. In some embodiments, the one or more guiding pieces include a body positioned not to obscure the patient's physical arch in an area thereof receiving dental treatment.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
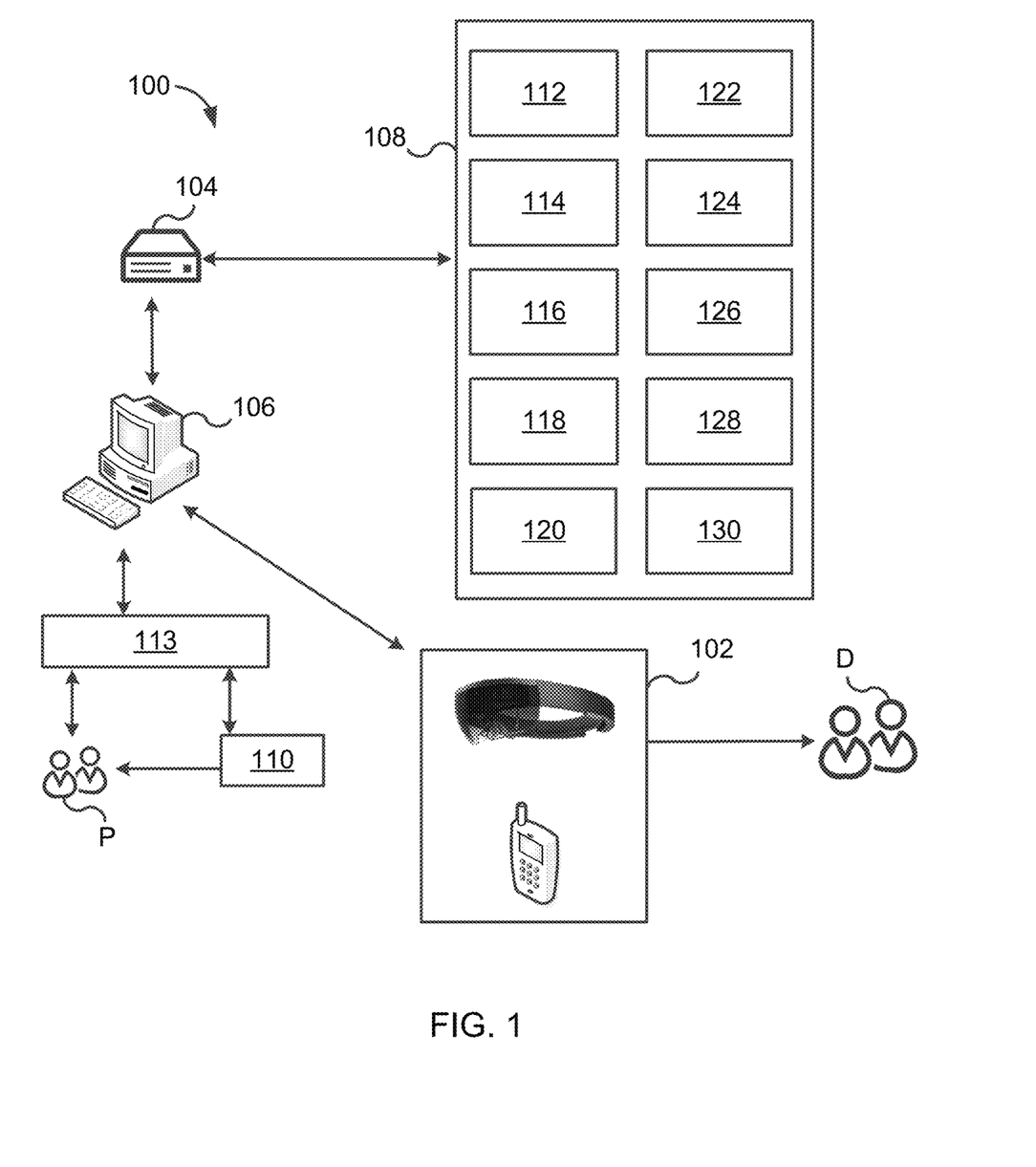
FIG. 1 is a schematic drawing of a system for providing dental treatment according to some embodiments of the present disclosure.

Referring now to FIG. 1, some embodiments of the present disclosure are directed to a system 100 for providing dental treatment, e.g., to a patient "P", plurality of patients, etc. As used herein, the term "dental treatment" includes application of physical apparatus, surgery, aesthetic and non-aesthetic augmentation, etc., to a patient's physical arch. As used herein, the term is "arch" is meant to refer to the structure receiving the dental treatment including, e.g., teeth, gums, adjacent oral anatomy, e.g., maxilla, mandible, etc., or combinations thereof, depending on the specific treatment case at hand and the needs of the practitioner in facilitating the treatment. In some embodiments, system 100 includes a mixed reality device 102. As used herein, the term "mixed reality" is used to refer to each of mixed reality and augmented reality. In some embodiments, mixed reality device 102 is a headset, smartphone, tablet computer, desktop computer, laptop computer, PDA, or combinations thereof. In some embodiments, system 100 includes a plurality of mixed reality devices 102. Those having skill in the art would understand that the systems and methods of the present disclosure could also be implemented utilizing virtual reality systems and methods as well. In some embodiments, mixed reality device 102 is a Hololens™ (Microsoft Corporation, Redmond, WA) or third-party derivative thereof. In some embodiments, mixed reality device 102 is a Magic Leap™ (Magic Leap, Inc., Dania Beach, FL). In some embodiments, mixed reality device 102 is a Meta™ (Meta Company, Redwood Shores, CA). In some embodiments, mixed reality device 102 is Project Alloy™ (Intel Corporation, Santa Clara, CA). In some embodiments, mixed reality device 102 is ODG R9 and ODG R8. In some embodiments, mixed reality device 102 is a device from Apple, Inc., e.g., iPhone, iPad, etc., capable of running ARKit™. In some embodiments, mixed reality device 102 is an Android® device (Google Inc., Mountain View, CA) capable of running ARCore™.

In some embodiments, system 100 includes a non-transitory computer storage media 104 coupled with a computing device 106 and encoded with one or more computer programs 108 for rendering dental treatment in mixed reality device 102, e.g., producing a virtual dental treatment template and applying the virtual dental treatment template to a patient's arch, as will be discussed in greater detail below. In some embodiments, computing device 106 includes a desktop computer, laptop computer, tablet computer, smartphone, PDA, cloud service, headset, etc.

In some embodiments, system 100 includes a physical guide 110. Physical guide 110 is configured to be installed in or on a patient during performance of dental treatment by a practitioner, e.g., practitioner "D." In some embodiments, physical guide 110 is configured not to obstruct a practitioner's view of an area receiving treatment during performance of that treatment. In some embodiments, physical guide 110 is configured to avoid interference with a patient's tongue. In some embodiments, physical guide 110 is installed inside a patient's mouth, outside of a patient's mouth, on a patient's head, e.g., the lips, cheeks, ears, forehead, etc., on a patient's physical arch, or combinations thereof. In some embodiments, physical guide 110 includes one or more stabilizing pieces configured to reversibly interface with the patient. In some embodiments, the stabilizing pieces are configured to hold physical guide 110 in a predetermined position with respect to the patient, e.g., the patient's arch. In some embodiments, the stabilizing pieces are configured for reversible interference fit with the patient. In some embodiments, the material used to make the physical guide is not easily deformable. In some embodiments, the stabilizing pieces include one or more retainers, partial retainers, stabilizing arms, stabilizing loops, or combinations thereof. In some embodiments, the term "retainer" includes a physical template that mirrors or conforms to the anatomy of the portions of the arch over which the template is installed. In some embodiments, stabilizing pieces of physical guide 110 correspond to at least a portion of the patient's arch. In some embodiments, physical guide 110 includes one or more guiding pieces, the one or more guiding pieces including a body positioned not to obscure the patient's arch when in use. In some embodiments, physical guide 110 includes one or more open regions. These open regions are sized and positioned for receiving a physical dental apparatus, as will be discussed in greater detail below. In some embodiments, the open regions are included on the stabilizing pieces, guiding pieces, or combinations thereof.

Referring now to FIGS. 2A-2F, as discussed above, some embodiments of the present disclosure are directed to a physical guide 200. In some embodiments, physical guide 200 includes one or more stabilizing pieces 202. Stabilizing pieces 202 are configured to hold physical guide 200 in a predetermined position with respect to the patient. In some embodiments, stabilizing pieces 202 include one or more recesses 202R to accommodate a patient's tongue when in use. In some embodiments, stabilizing pieces 202 include a retainer 202A. In some embodiments, retainer 202A is a full arch retainer, i.e., includes a mold/cast of each tooth in a patient's arch. In some embodiments, retainer 202A is a partial retainer, i.e., includes a mold/cast of some, but not all, of the teeth in the patient's arch. In some embodiments, retainer 202A only includes structures corresponding to a portion of the patient's arch, e.g., only the left side, only the right side, all teeth except the third molars, etc. In some embodiments, retainer 202A only includes structures corresponding to the portion of the patient's arch that requires dental treatment. In some embodiments, retainer 202A only includes structures corresponding to the portion of the patient's arch that does not require dental treatment. In some embodiments, retainer 202A extends beyond the gumline, about even with the gumline, only partially along the tooth towards the gumline (see FIG. 2C), or combinations thereof.

Figure 2A:
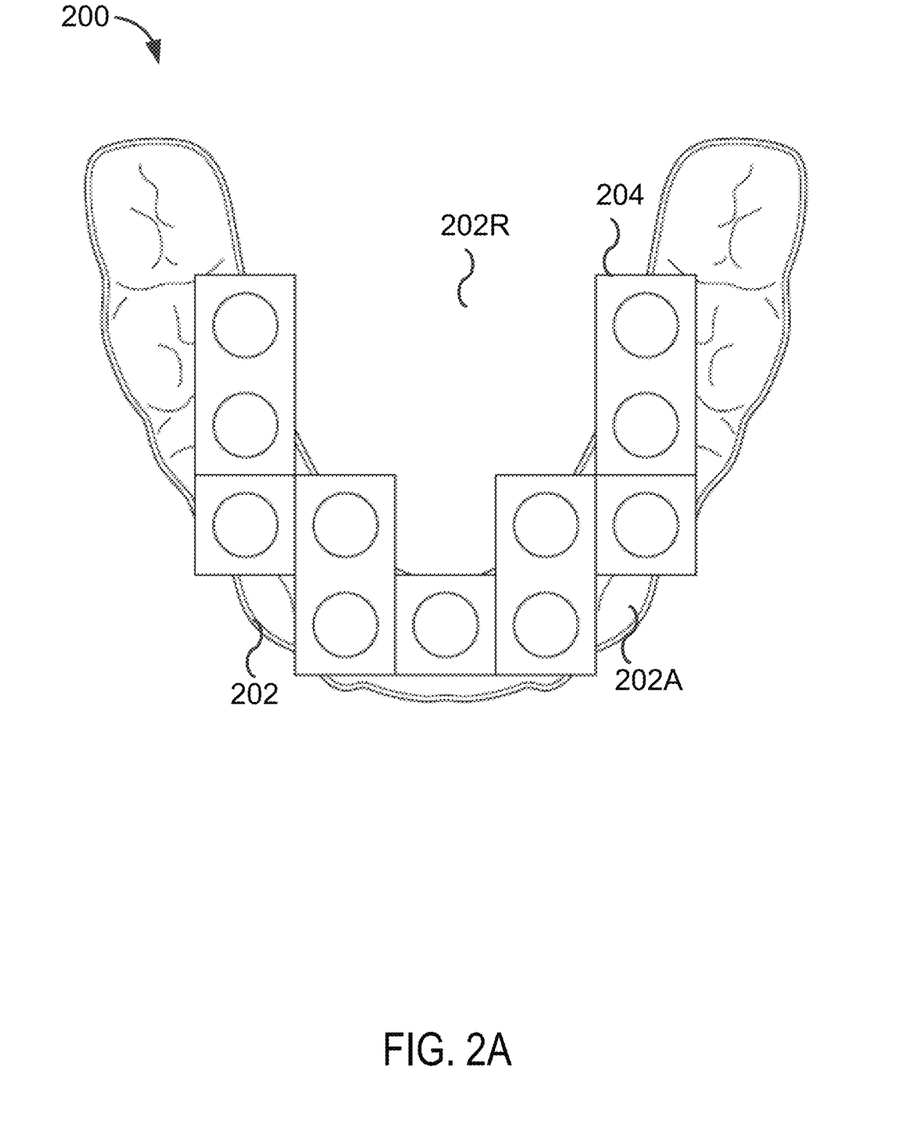
FIG. 2A shows a schematic view of a physical guide for providing dental treatment according to some embodiments of the present disclosure.
Figure 2B:
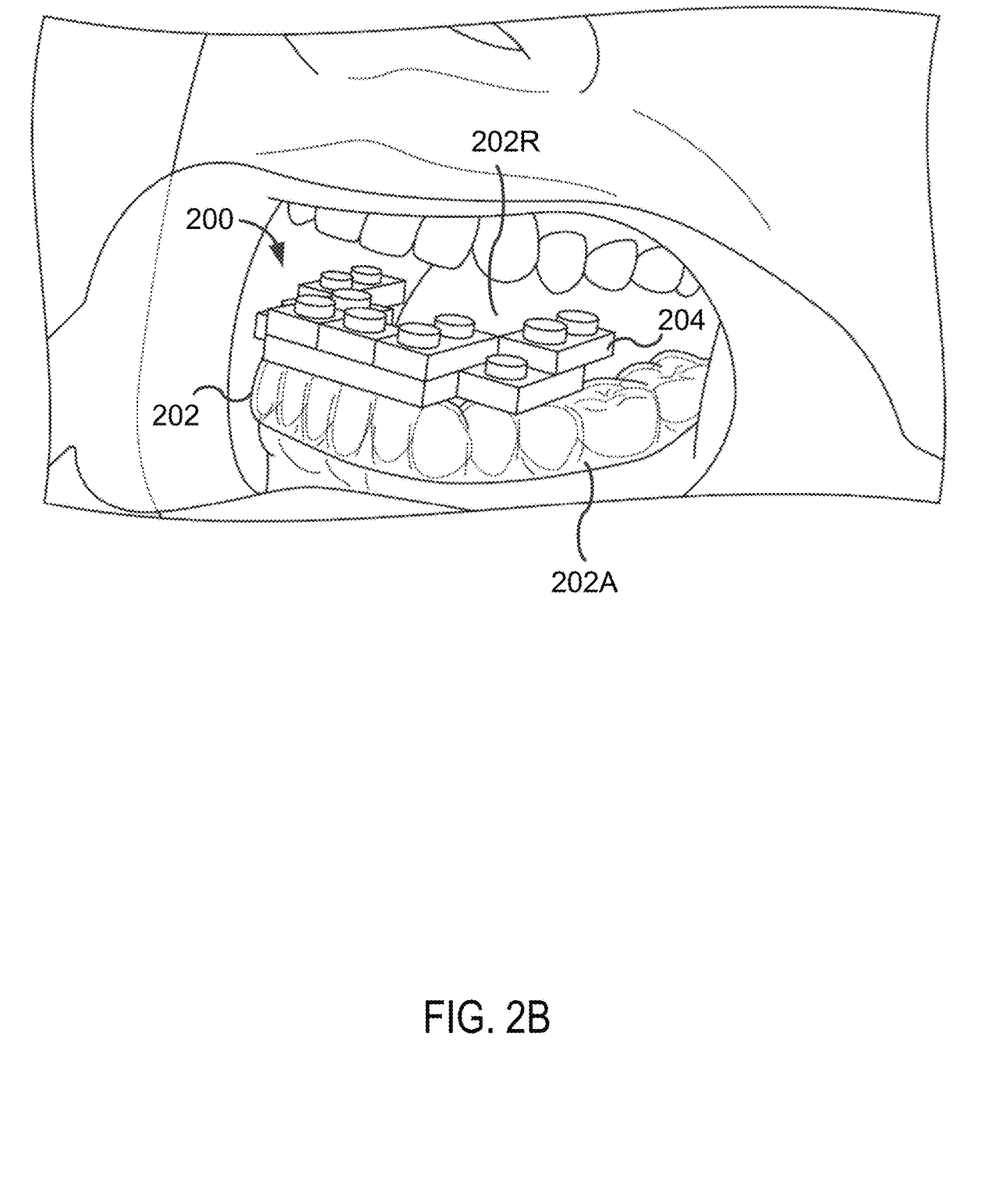
FIG. 2B shows a schematic view of a physical guide for providing dental treatment according to some embodiments of the present disclosure as positioned within a patient's mouth.
Figure 2C:
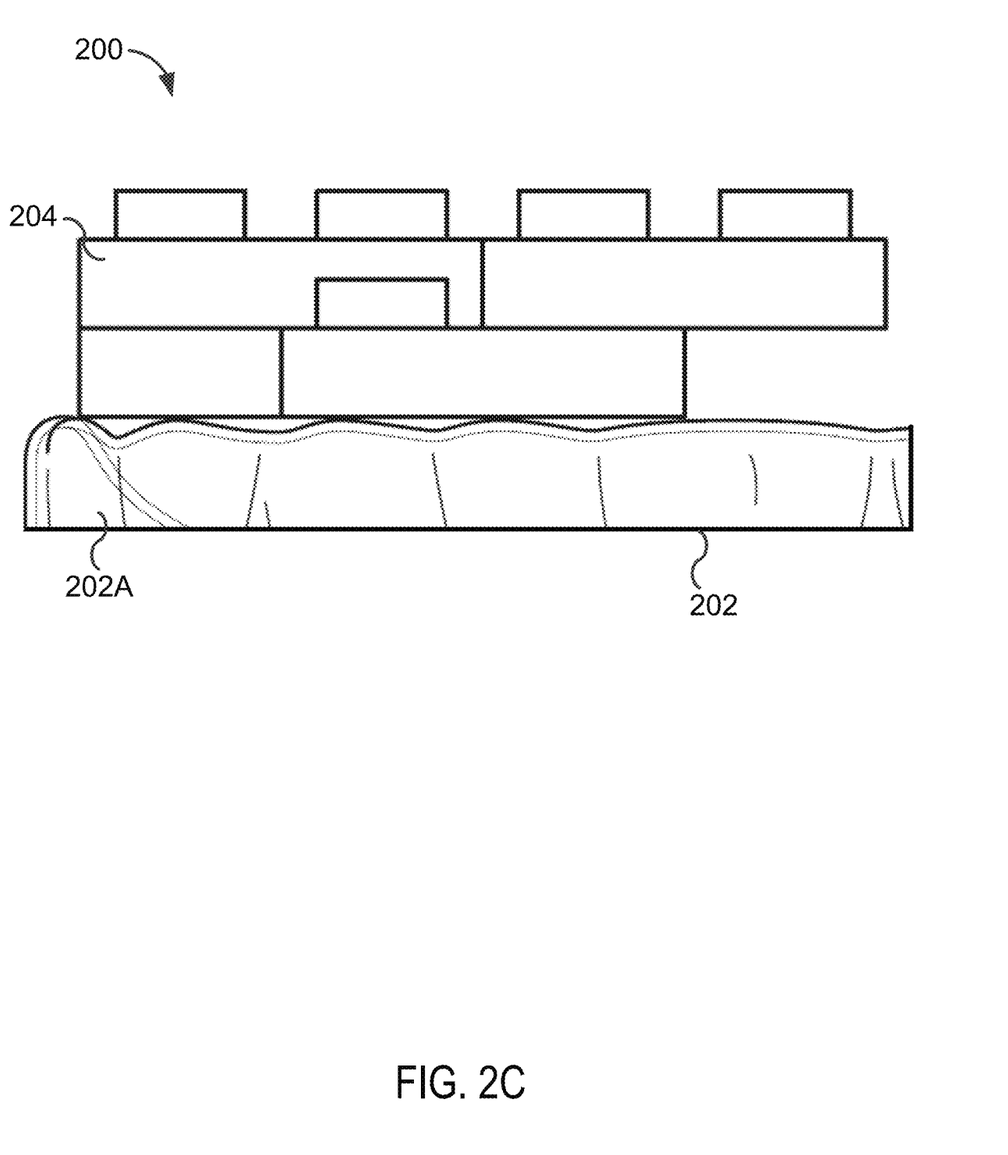
FIG. 2C shows a schematic view of a physical guide for providing dental treatment according to some embodiments of the present disclosure.
Figure 2D:
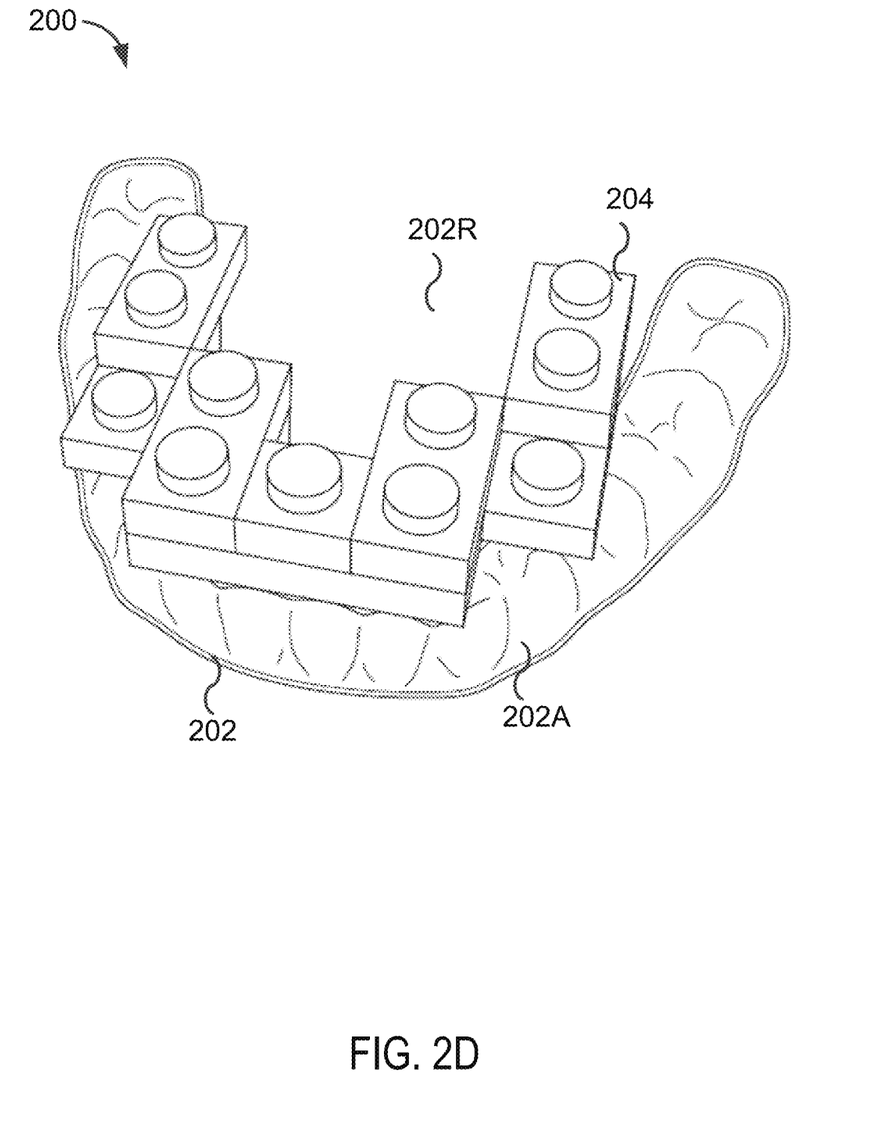
FIG. 2D shows a schematic view of a physical guide for providing dental treatment according to some embodiments of the present disclosure.
Figure 2E:
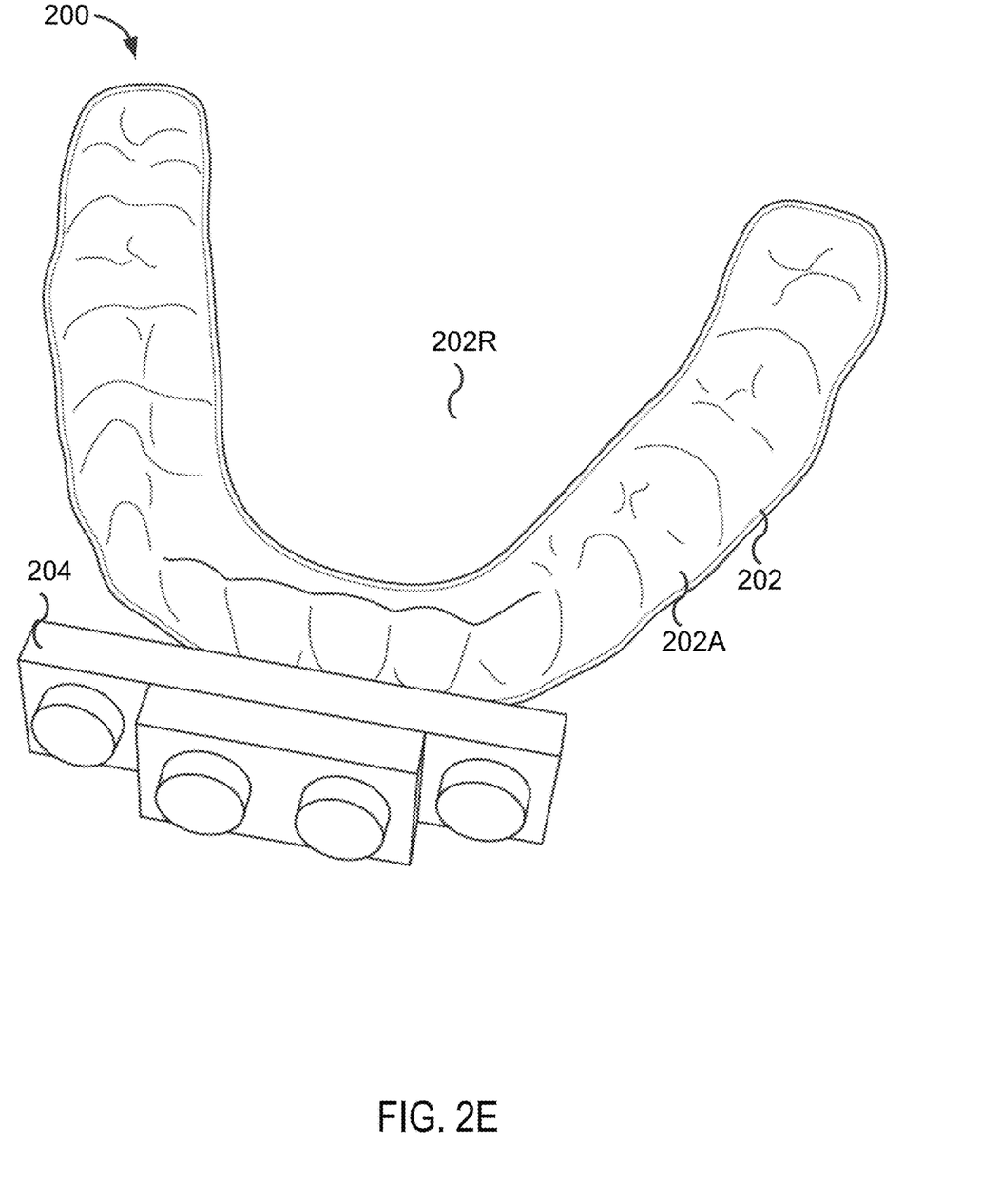
FIG. 2E shows a schematic view of a physical guide for providing dental treatment according to some embodiments of the present disclosure.
Figure 2F:
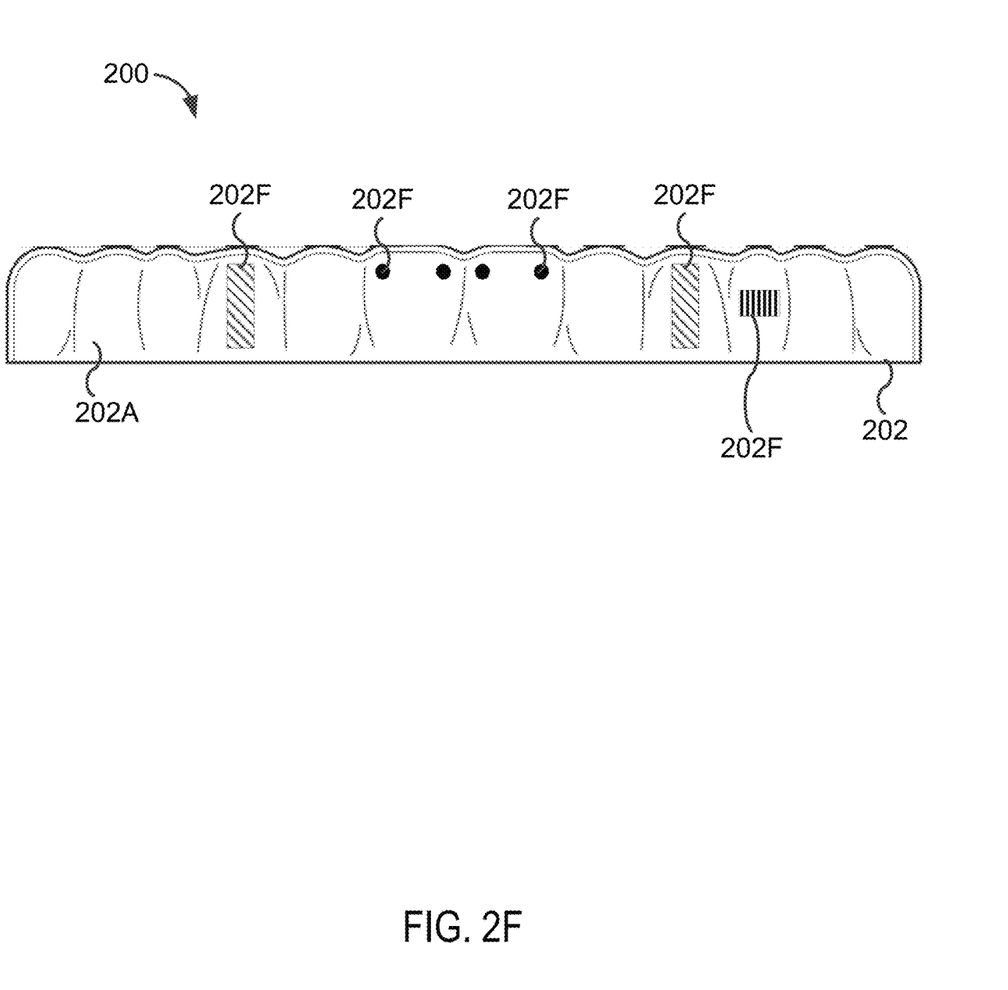
FIG. 2F shows a schematic view of a physical guide for providing dental treatment according to some embodiments of the present disclosure.

Referring specifically to FIGS. 2D-2F, some embodiments of physical guide 200 include one or more guiding pieces 204. As discussed above, guiding piece 204 is configured to be visible within the field of view of a mixed reality device, e.g., mixed reality device 102, during treatment. In some embodiments, guiding piece 204 is positioned so as not to obstruct a practitioner's view of the area receiving treatment during performance of that treatment. In some embodiments, guiding piece 204 is sized to be about the same width as the patient's physical arch. In some embodiments, guiding piece 204 is shaped and has a guide width corresponding to a width of the patient's physical arch. In some embodiments, guiding piece 204 is sized to have a width smaller than that of the patient's physical arch. In some embodiments, guiding piece 204 is sized to have a width larger than that of the patient's physical arch. In some embodiments, guiding piece 204 is sized to be about the same height as the patient's physical arch. In some embodiments, guiding piece 204 is sized to have a height smaller than that of the patient's physical arch. In some embodiments, guiding piece 204 is sized to have a height larger than that of the patient's physical arch. In some embodiments, guiding piece 204 piece is sized to be about the same depth as the patient's physical arch. In some embodiments, guiding piece 204 is sized to have a depth smaller than that of the patient's physical arch. In some embodiments, guiding piece 204 is sized to have a depth larger than that of the patient's physical arch. In some embodiments, guiding piece 204 is generally "I" shaped, "U"-shaped (see FIG. 2D), linear (see FIG. 2E), circular, pyramidal, 2-dimensional, 3-dimensional, or combinations thereof. In some embodiments, guiding piece 204 is positioned above stabilizing piece 202. In some embodiments, guiding piece 204 is positioned within stabilizing piece 202. In some embodiments, guiding piece 204 is positioned in front of stabilizing piece 202. In some embodiments, guiding piece 204 is positioned behind stabilizing piece 202. Referring specifically to FIG. 2F, in some embodiments, physical guide 200 eliminates a physical guiding piece, e.g., guiding piece 204. In some embodiments, physical guide includes one or more feature points 202F, as will be discussed in greater detail below.

Figure 2G:
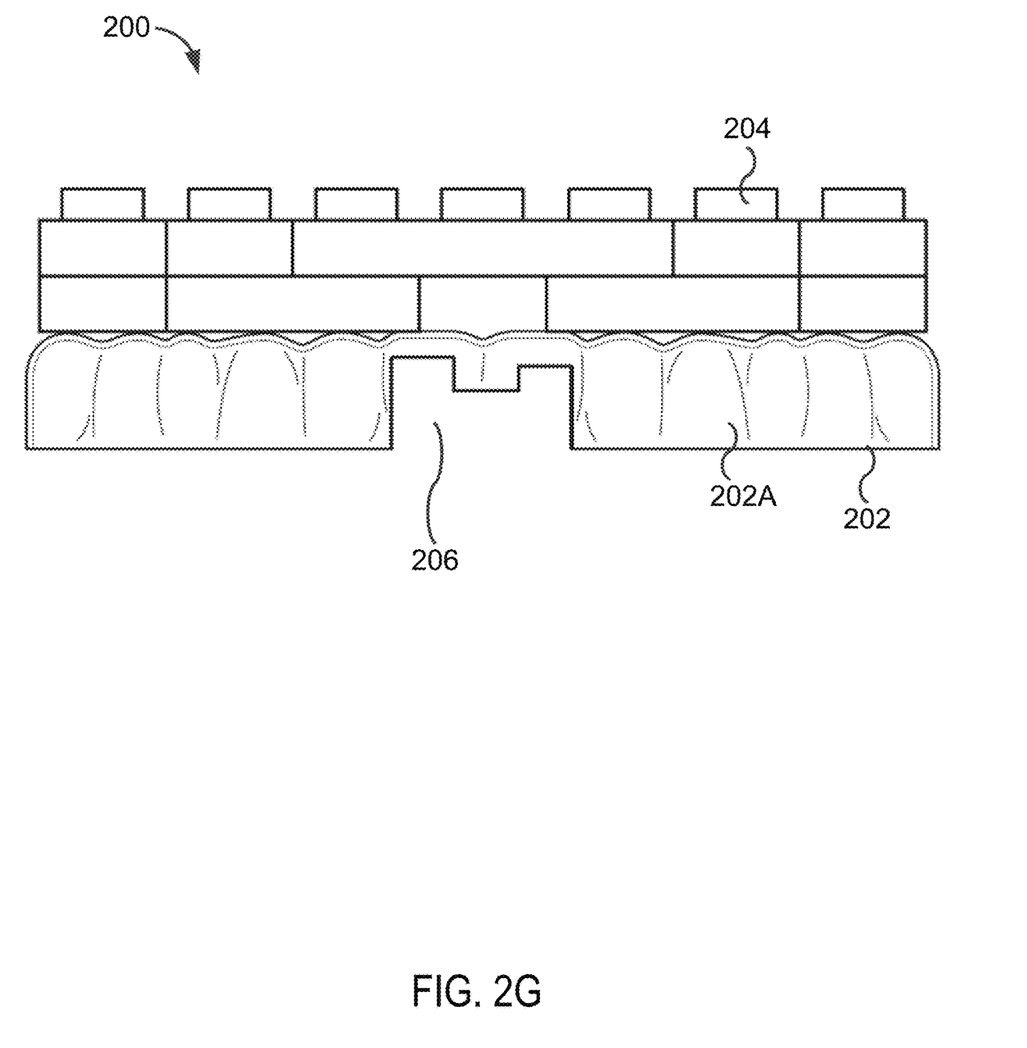
FIG. 2G shows a schematic view of a physical guide for providing dental treatment according to some embodiments of the present disclosure.

Referring specifically to FIG. 2G, in some embodiments, physical guide 200 includes one or more open regions 206. Open regions 206 are configured to allow for installation of physical dental apparatus below, above, adjacent, and/or through physical guide 200. In some embodiments, open regions 206 are approximately the size of a bracket to provide space for installation of a physical bracket on a patient's arch even while physical guide 200 is installed on the arch. In some embodiments, open regions 206 are included on stabilizing pieces 202, guiding pieces 204, or combinations thereof.

Referring again to FIG. 1, in some embodiments, system 100 includes software 112 for scanning the patient's physical arch, a physical representation of a patient's arch, e.g., a mold/cast thereof, physical guide 110, or combinations thereof. Scanning the patient's physical arch/physical guide 110 provides a virtual representation of the scanned structure. In some embodiments where software 112 scans the patient's arch, the software provides scan data to render a "virtual arch" with features and/or structures that correspond to features and/or structures on the physical arch. In some embodiments where software 112 scans physical guide 110, the software provides scan data to render a "virtual guide" with features and/or structures that correspond to features and/or structures on the physical guide, as will be discussed in greater detail below. In some embodiments, software 112 scans physical guide 110 and the patient's physical arch while the physical guide is installed on the arch, thus providing scan data to render a virtual guide already aligned with a virtual arch. As discussed above, in some embodiments, physical guide 110 includes full or partial retainers which correspond to structures on the patient's physical arch. Thus, in embodiments where software 112 scans physical guide 110, the scan also includes scan data to generate a virtual arch, i.e., a virtual representation of an arch which corresponds to the full or partial retainers on the virtual guide.

In some embodiments, system 100 includes a scanning/imaging device 113. As used herein, the terms "scanning" and "imaging" can be used interchangeably to refer to processes of obtaining scan data of physical arches and guides for use in system 100, as is discussed in greater detail below. In some embodiments, the physical arch/face scans are performed by any suitable scanning device 113 and associated scanning protocol. In some embodiments, the scanning is performed by a 3D scanner. In some embodiments, the scanner is an intraoral scanner. In some embodiments, the scanner is a 3D radiographic scanner. In some embodiments, the scanner is a CT scanner. In some embodiments, scanning device 113 is an iTero® (Align Technology, Inc., San Jose, CA), True Definition Scanner™ (3M Company, St. Paul, MN), a scanner from Carestream Dental, Atlanta, GA, 3D Imaging by Dentsply Sirona, York, PA, 3D Imaging Systems by Vatech, Korea, or 3D Imaging by Planmeca, Finland, or combinations thereof. In some embodiments, the format of the scan is any suitable format, e.g., Digital Imaging and Communications in Medicine (DICOM), STL, FBX, Blender, Adobe® Maya, CAD file, e.g., OBJ, DCM, CSZ, PLY, CDT, CS3, IDT, SDT, etc.

Referring still to FIG. 1, in some embodiments, system 100 includes software 114 for rendering the virtual guide. As discussed above, the virtual guide is a virtual representation of at least a portion of physical guide 110, and is configured to occupy a predetermined position with respect to the virtual arch. In some embodiments, software 114 renders the virtual guide along with the virtual arch. In some embodiments, software 114 enables the virtual guide to be edited, trimmed, or shaped. In some embodiments, the virtual guide includes all the physical features of physical guide 110. In some embodiments, the virtual includes only a portion of the physical features of physical guide 110.

As discussed above, in some embodiments, the virtual guide is rendered from one or more scans of physical guide 110. In some embodiments, the virtual guide is produced, e.g., in a 3D modeling program. In some embodiments, the 3D modeling program is Unity, Unreal Engine, custom dental modeling program, etc.

Still referring to FIG. 1, in some embodiments, system 100 includes software 116 for positioning a virtual target to produce a virtual dental treatment template. In some embodiments, virtual targets are positioned on the virtual arch, virtual guide, or combinations thereof to create the virtual dental treatment template. In some embodiments, the virtual targets in the virtual dental treatment template are positioned relative to the virtual guide, e.g., the virtual guiding piece, the virtual retainer, or combinations thereof. The virtual dental treatment template is the blueprint for the practitioner, portraying the relevant dental apparatus at locations on the virtual arch to facilitate a desired treatment outcome. In some embodiments, virtual dental treatment template production software 116 is any development environment suitable for use with the above-identified devices. In some embodiments, virtual dental treatment template production software 116 is Unity™ (Unity Technologies, San Francisco, CA); Unreal® (Epic Games, Inc., Cary, NC); Rage™ (Take-Two Interactive Software, Inc., New York, NY); CryEngine® (Crytek GMBH, Frankfurt am Main DE); Havok® (Telekinesys Research Ltd. Co., Dublin, IE); HeroEngine® (Idea Fabrik Plc, Germantown, MD); ShiVa3D™ (ShiVa Technologies SAS, Grasse FR); Project Anarchy™ (Telekinesys Research Ltd. Co., Dublin, IE); GameMaker® (Yoyo Games Ltd., UK), GameSalad® (GameSalad Inc., Austin TX), ARKit™ (Apple Inc., Cupertino, CA), or a combination thereof.

In some embodiments, the virtual target is a virtual dental apparatus, a grid, treatment diagram, status indicator, prior disposition of the patient's arch, current disposition of the patient's arch, estimated future disposition of a patient's arch, or combinations thereof. A practitioner's choice of virtual target or combination of virtual targets enables to practitioner to visualize and implement a course of treatment prior to, during, and after the treatment has occurred. In some embodiments, the virtual dental apparatus is any component suitable to achieving a desired treatment result, including a bracket, archwire, implant, reconstructed tooth, replacement tooth, alveolar ridge augmentation, alignment tray, aesthetic restoration, non-aesthetic restoration, or a combination thereof. In some embodiments, a grid can be overlaid as part of the virtual dental treatment template in order to aid in the placement of physical dental apparatus, measure distances between dental apparatus or components of the physical arch, etc. In some embodiments, a treatment diagram can be overlaid to show a virtual workflow of the patient's dental treatment, including defining an order in which apparatus will be applied, boundaries on teeth marking where a tooth is to be ground, targets identifying where a practitioner is to drill, e.g., for treatment of cavities, installation of implants, etc. In some embodiments, one or more status indicators can be included, allowing the practitioner to individually mark or identify components of the physical arch to aid in practitioner workflow. By way of example, the status indicator virtual target can highlight those teeth to be worked on during the dental treatment, so that it is more clear to the practitioner which components of the physical arch need attention and those that do not. By way of further example, in some embodiments, the status indicator includes a list of statuses for a given physical arch component to alert the practitioner of not only the current status of the component but the prescribed treatment to be performed according to the patient's treatment plan, e.g., apply a bracket, address discoloration, review local gum health, etc. In some embodiments, past, present, and estimated future dispositions of components of the physical arch are incorporated into the virtual dental treatment template. Such embodiments enable a practitioner to view a full medical history of the patient's dental treatment plan, including physical changes to components as treatment progresses, such as changes in location, size, coloration, health, etc., as well as display the same to the patient themselves. Thus, the practitioner and the patient can view overlays of a dental treatment plan to facilitate "before and after" comparisons, i.e., how the arch has changed since a previous treatment, how the arch is expected to look by a next treatment, how the arch is expected to look by the end of treatment, etc. In some embodiments, the virtual targets are added, removed, and/or edited in real-time. In these embodiments, the practitioner as well as the patient can discuss a proposed dental treatment plan and implement any changes necessary, such as to achieve a patient's desired treatment outcome, change aesthetic aspects of the treatment, etc. By way of example, the practitioner could change the color of virtual brackets from metal to clear, show how clear aligners may look, display different restorative options, etc. In some embodiments, these demonstrations are recorded for future replay.

In some embodiments, the virtual dental treatment template is disposed at a predetermined position with respect to the virtual arch, the virtual guide, or a combination thereof. In this way, the virtual dental treatment template can be rendered at a desired position so long as the location of at least one of the virtual arch or the virtual guide is known.

In some embodiments, system 100 includes software 118 for rendering the virtual guide in mixed reality device 102. In some embodiments, only a portion of the virtual guide is rendered in mixed reality device 102. By rendering the virtual guide in mixed reality device 102 worn or held by the practitioner, the virtual guide is presented in the same view that includes the patient and the physical guide. In some embodiments, the rendered virtual guide can be manipulated, e.g., translated, rotated, tilted, enlarged, shrunk, colored, shaded, etc., in mixed reality device 102. In some embodiments, practitioners are able to zoom in and out on the virtual guide to see details thereof up close. In some embodiments, the virtual guide can be further edited in mixed reality device 102, e.g., by adding/removing one or more virtual targets, displaying alternative treatment options, adding or removing aspects of virtual guiding pieces/virtual stabilizing pieces, etc.

In some embodiments, system 100 includes software 120 for identifying a superimposition between the virtual guide and the physical guide. In some embodiments, system 100 includes software 122 for rendering the virtual dental treatment template in mixed reality device 102 at a predetermined position with respect to the physical guide, the predetermined position with respect to the physical guide corresponding to the predetermined position with respect to the virtual arch, the virtual guide, or a combination thereof. Because system 100 knows the relative location of the virtual dental treatment apparatus with respect to the virtual guide, superposition in mixed reality device 102 of the virtual guide and the physical guide (when the physical guide is installed in a patient) aligns the virtual dental treatment template with the patient's physical arch. This enables a practitioner to, in a single field of view, visualize the patient and the work to be done on the patient, so that the practitioner is essentially given an overlay of the work as completed on the very patient upon which the work will be performed. In some embodiments, the virtual dental treatment template is movable within the mixed reality environment. In some embodiments, the virtual dental treatment template is rotatable within the mixed reality environment. In some embodiments, the virtual dental treatment template is tiltable within the mixed reality environment. In some embodiments, the virtual dental treatment template is rendered opaque. In some embodiments, the virtual dental treatment template is rendered translucent. In some embodiments, the practitioner can zoom in and out to magnify the field of view including the virtual dental treatment template. In some embodiments, the virtual dental treatment template as rendered in mixed reality device 102 includes all virtual dental apparatus. In some embodiments, the virtual dental treatment template is rendered incrementally, e.g., once a first physical dental apparatus is aligned with a first rendered virtual dental apparatus, the first rendered virtual dental apparatus is no longer rendered and a subsequent virtual dental apparatus is rendered. In some embodiments, the virtual dental treatment template can be manually positioned in a desired location within the mixed reality environment. In some embodiments, the virtual dental treatment template can be manually locked in a desired location within the mixed reality environment. These embodiments are particularly useful in the production of crowns, restored teeth, or reconstructed teeth. Practitioners/dental labs shaping the physical crown, restored tooth, or reconstructed tooth can have a virtual representation of it rendered within the mixed reality environment and "lock" the virtual representation in place in the practitioner's physical workspace. Thus, the virtual crown, restored tooth, or reconstructed tooth can be overlaid on or at least observable in the same field of view as the potential restoration, material that is to be fashioned into the physical crown, tooth to be restored or reconstructed, or a representative physical model of the potential restoration, as it is being shaped or previewed for treatment planning and/or fabrication. In each case, it is easier for practitioners to follow the template represented by the virtual crown, restored tooth, or reconstructed tooth and produce a more accurate physical representation.

In some embodiments, system 100 includes software 124 for identifying the one or more feature points on the virtual guide, physical guide, or combination thereof. In some embodiments, software 124 includes Vuforia's Model Target Generator, Binary Robust Invariant Scalable Keypoints, etc., or combinations thereof. In some embodiments, baseline angle and distance is defined, as well as the feature points viewable at the baseline angle. In some embodiments, a dataset is produced for use in tracking in the mixed reality program. The feature points offer additional features for confirming the superimposition between the virtual guide and the physical guide in mixed reality device 102. In some embodiments, the feature points identified vary depending on the structural features of the guides. In some embodiments, the feature points include high-contrast spots, corners, blobs, t-junctions, curves, edges, markers, shapes, objects, colors, textures, patterns, images, fluorescent regions, QR-codes, the stabilizing pieces, the guiding pieces, other 2-dimensional or 3-dimensional objects, etc., or combinations thereof. In some embodiments, the feature points are substantially evenly distributed on the guides.

In some embodiments, system 100 includes software 126 for identifying a superimposition of at least a portion of the one or more feature points on the virtual guide and corresponding feature points on the physical guide in mixed reality device 102. In some embodiments, the mixed reality software, e.g., software 120, 122, 124, 126, etc., aligns the feature points from the virtual guide with corresponding feature points on the physical guide, thus aligning the virtual dental treatment template with the physical arch. In some embodiments, the neighborhood around the feature points, the physical arch, the physical guide, etc., are used to align the virtual guide with the physical guide. Once the virtual guide and the physical guide are aligned, congruency/superimposition of the virtual dental treatment template with the physical arch are achieved. The virtual guide is particularly advantageous because it offers easily identifiable features for alignment, and further these easily identifiable features can be identified across a plurality of differing fields of view. By way of example, the entire retainer of the physical guide may not always be in the field of view of mixed reality device 102, e.g., being covered by the patient's lip or while a practitioner is working on specifically on a given side of the physical arch. However, the presence of feature points on the physical/virtual guides helps system 100 identify superposition using those points that are in view.

In some embodiments, system 100 includes software 128 for maintaining the superimposition between the virtual guide and physical guide 110 in mixed reality device 102. Maintaining the alignment between the virtual guide and physical guide 110 gives both the practitioner and the patient the freedom to move or reorient themselves in physical space. Thus, a practitioner can momentarily look away to retrieve or swap out dental instruments, and the patient can move their head or body, without necessitating a realignment. Even if the practitioner moves, such as for a better viewing angle, the guide remains "snapped" in place and does not need to be realigned. Because mixed reality device 102 may include accelerometers, gyroscopes, magnetometer and other sensors, the mixed reality device can be moved/shifted from its original position while the patient stays in place and the virtual dental treatment template would still be able to maintain the congruency/superimposition.

In some embodiments, system 100 includes software 130 for identifying an alignment between a physical dental apparatus and the virtual dental apparatus from the virtual dental treatment template. In some embodiments, alignment is identified by a change in color of the virtual target, change in color of the virtual dental treatment template, a haptic feedback to a practitioner, an auditory feedback to a practitioner, a visual feedback to a practitioner, or combinations thereof. In some embodiments, alignment is accompanied by a feedback to a dental tool. In such embodiments, system 100 enables operation of the dental tool when the tool is in proper position to execute the prescribed dental treatment, e.g., a dental drill is positioned at the proper angle relative to the patient's physical arch. In some embodiments, system 100 disables operation of a dental tool when the tool is not in a position to execute a prescribed treatment, e.g., a dental drill is not at the proper angle relative to the patient's physical arch.

Figure 3:
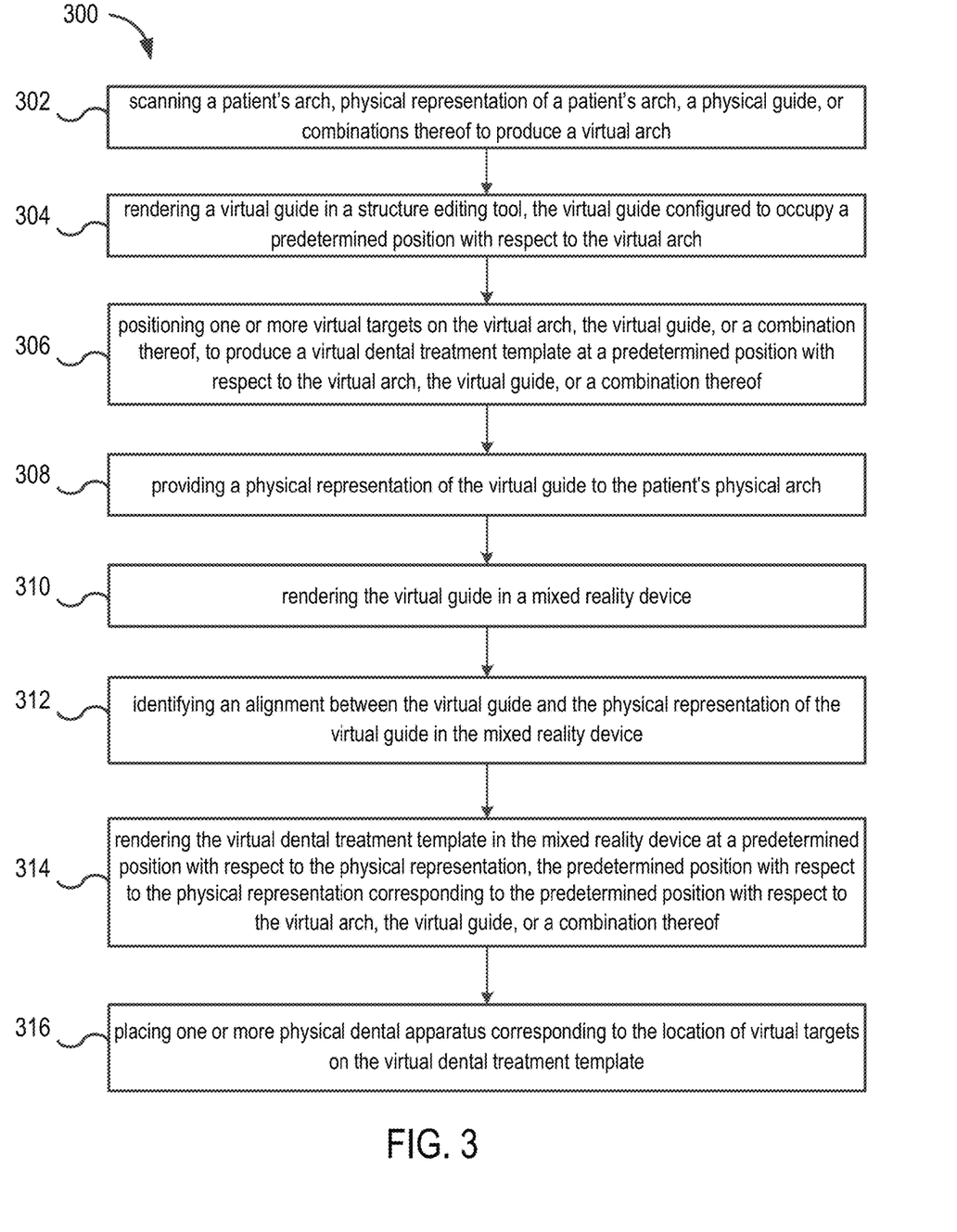
FIG. 3 is a chart of a computer implemented method for providing dental treatment according to some embodiments of the present disclosure.

Referring now to FIG. 3, some embodiments of the present disclosure are directed to a method 300 for aligning a virtual dental treatment template with a physical arch in mixed reality. At 302, a patient's arch, physical representation of a patient's arch, physical guide, or combinations thereof are scanned, e.g., to produce a virtual arch and/or a virtual guide. At 304, a virtual guide is rendered, e.g., in a structure editing tool. As discussed above, the virtual guide configured to occupy a predetermined position with respect to the virtual arch. At 306, one or more virtual targets is positioned on the virtual arch, the virtual guide, or a combination thereof, to produce a virtual dental treatment template. At 308, a physical representation of the virtual guide, e.g., a physical guide, is provided to the patient's physical arch. In some embodiments, the physical representation is 3D printed. As discussed above, the virtual dental treatment template occupies a predetermined position with respect to the virtual arch, the virtual guide, or a combination thereof. Thus, when the position of the physical representation of the virtual guide is known, the virtual dental treatment template can be positioned accordingly. By fitting the physical guide in the patient's mouth/over the physical arch, the system accurately tracks the position of tooth/teeth and also their orientation and dimension. This enables the proper superimposition of the virtual dental treatment template with the physical arch. At 310, the virtual guide is rendered in a mixed reality device. At 312, an alignment between the virtual guide and the physical representation of the virtual guide is identified in the mixed reality device. At 314, the virtual dental treatment template is rendered in the mixed reality device at a predetermined position with respect to the physical representation, the predetermined position with respect to the physical representation corresponding to the predetermined position with respect to the virtual arch, the virtual guide, or a combination thereof. At 316, one or more physical dental apparatus is placed in a location corresponding to the location of virtual targets on the virtual dental treatment template.

The methods and systems of the present disclosure are advantageous in that the physical and virtual guides optimize alignment between a virtual dental treatment template and a patient's physical arch in mixed reality to allow practitioners to more accurately apply physical dental apparatus to a patient's physical arch. The retainer portion ensures the physical guide remains in place, but does so without interfering with the placement of physical dental apparatus. With the guide firmly in place, the guiding piece provides abundant feature points for reliable alignment between the virtual dental treatment template and the physical arch, which can be maintained even while practitioners and patient's readjust their positioning throughout a treatment. This improved alignment capability is useful in situations where the oral anatomy may be outside of, or obscured by the field of view of the mixed reality device. The systems of the present disclosure also reduce the effects of insufficient illumination, reflective interference, insufficient contrast or distinctive texturing in the arch, etc., which can hinder accurate superimposition of a virtual dental treatment template on a physical arch in a mixed reality space.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A system for providing dental treatment comprising:
    a mixed reality device;
    a physical guide configured to be positioned wholly intraorally, the physical guide being a physical representation of a virtual guide;
    one or more intraoral scans of a portion of a patient's arch;
    a non-transitory computer storage media coupled with a computing device and encoded with one or more computer programs for producing a virtual dental treatment template and applying the virtual dental treatment template to the patient's arch, the one or more computer programs including:
        software executing on a computer readable medium for performing an intraoral scan of the patient's arch to produce the one or more scans and a virtual arch corresponding to the patient's arch;
        software executing on a computer readable medium for rendering a virtual guide from the intraoral scans, the virtual guide configured to occupy a predetermined position with respect to the virtual arch;
        software executing on a computer readable medium for positioning a virtual target on or relative to the virtual arch, the virtual guide, or a combination thereof, and producing a virtual dental treatment template disposed at a predetermined position with respect to the virtual arch, the virtual guide, or a combination thereof;
        software executing on a computer readable medium for rendering the virtual guide in the mixed reality device;
        software executing on a computer readable medium for identifying a superimposition between the virtual guide and the physical guide;
        software executing on a computer readable medium for maintaining the superimposition between the virtual guide and the physical guide in the mixed reality device; and
        software executing on a computer readable medium for rendering the virtual dental treatment template in the mixed reality device at a predetermined position with respect to the physical guide, the predetermined position with respect to the physical guide corresponding to the predetermined position with respect to the virtual arch, the virtual guide, or a combination thereof.

2. The system according to claim 1, wherein the physical guide includes one or more stabilizing pieces configured for reversible interference fit on the patient.

3. The system according to claim 2, wherein the one or more stabilizing pieces include a retainer corresponding to at least a portion of the patient's arch.

4. The system according to claim 3, wherein the retainer includes one or more open regions for receiving a physical dental apparatus.

5. The system according to claim 2, wherein the physical guide includes one or more guiding pieces, the one or more guiding pieces including a body positioned intraorally and so as not to obscure the patient's arch when in use.

6. The system according to claim 1, wherein the virtual target is a virtual dental apparatus, a grid, treatment diagram, status indicator, prior disposition of the patient's arch, current disposition of a patient's arch, estimated future disposition of a patient's arch, or combinations thereof.

7. The system according to claim 6, further comprising:
    software executing on a computer readable medium for identifying an alignment between a physical dental apparatus and the virtual dental apparatus, wherein alignment is identified by a change in color of the virtual dental treatment template, by a haptic feedback to a practitioner, by an auditory feedback to a practitioner, by a visual feedback to a practitioner, by a feedback to a dental tool, or combinations thereof.

8. The system according to claim 6, wherein the virtual dental apparatus includes a bracket, implant, reconstructed tooth, replacement tooth, alveolar ridge augmentation, alignment tray, aesthetic restoration, non-aesthetic restoration, or a combination thereof.

9. The system according to claim 1, wherein the physical guide and virtual guide include one or more additional feature points for confirming the superimposition between the virtual guide and the physical guide in the mixed reality device.

10. The system according to claim 9, further comprising:
software executing on a computer readable medium for identifying the one or more additional feature points on the virtual guide; and
software executing on a computer readable medium for identifying a superimposition of at least a portion of the one or more additional feature points on the virtual guide and corresponding feature points on the physical guide in the mixed reality device.

11. A method for aligning a virtual dental treatment template with a physical arch in mixed reality, comprising:
performing an intraoral scan of a patient's physical arch to produce a virtual arch;
rendering a virtual guide in a structure editing tool from the intraoral scans, the virtual guide configured to occupy a predetermined position with respect to the virtual arch;
positioning one or more virtual targets on the virtual arch, the virtual guide, or a combination thereof, to produce a virtual dental treatment template at a predetermined position with respect to the virtual arch, the virtual guide, or a combination thereof;
providing a physical representation of the virtual guide, wherein the physical representation of the virtual guide is configured to be positioned wholly intraorally;
providing the physical representation of the virtual guide to the patient's physical arch;
rendering the virtual guide in a mixed reality device;
identifying an alignment between the virtual guide and the physical representation of the virtual guide in the mixed reality device; and
rendering the virtual dental treatment template in the mixed reality device at a predetermined position with respect to the physical representation, the predetermined position with respect to the physical representation corresponding to the predetermined position with respect to the virtual arch, the virtual guide, or a combination thereof.

12. The method according to claim 11, further comprising placing one or more physical dental apparatus on the patient's physical arch corresponding to the location of virtual targets on the virtual dental treatment template.

13. The method according to claim 12, wherein the virtual guide includes one or more virtual guiding pieces.

14. The method according to claim 13, wherein the one or more guiding pieces include a body positioned intraorally and so as not to obscure the patient's physical arch in an area thereof receiving dental treatment.

15. The method according to claim 11, wherein the one or more virtual targets include a virtual dental apparatus, a grid, treatment diagram, status indicator, prior disposition of the patient's arch, current disposition of a patient's arch, estimated future disposition of a patient's arch, or combinations thereof.

16. The method according to claim 11, wherein the virtual dental apparatus includes a bracket, implant, reconstructed tooth, replacement tooth, alveolar ridge augmentation, alignment tray, aesthetic restoration, non-aesthetic restoration, or a combination thereof.

17. The method according to claim 11, wherein the virtual guide includes one or more virtual stabilizing pieces.

18. The method according to claim 17, wherein the one or more virtual stabilizing pieces include a retainer corresponding to at least a portion of the patient's physical arch.

19. A system for providing dental treatment comprising:
a mixed reality device;
a scanning device;
a physical guide configured to be positioned wholly intraorally and for reversible interference fit over a corresponding structure on a patient's physical arch, the physical guide being a physical representation of a virtual guide and including a guiding piece and one or more retainer portions corresponding to at least a portion of the patient's physical arch, wherein the one or more guiding pieces are positioned above the one or more retainer portions and include one or more recesses to accommodate a patient's tongue when in use;
a non-transitory computer storage media coupled with a computing device and encoded with one or more computer programs for rendering dental treatment in the mixed reality device, the one or more computer programs including:
software executing on a computer readable medium for performing an intraoral scan of the patient's physical arch to produce a virtual arch;
software executing on a computer readable medium for generating a virtual guide from the intraoral scans, the virtual guide including one or more virtual guiding pieces and one or more virtual retainer portions corresponding to at least a portion of the virtual arch, the virtual guide configured to occupy a predetermined position with respect to the virtual arch;
software executing on a computer readable medium for positioning one or more virtual targets on or relative to the virtual arch, the virtual guide, or a combination thereof, to produce a virtual dental treatment template at a predetermined position with respect to the virtual arch, the virtual guide, or a combination thereof;
software executing on a computer readable medium for identifying one or more additional feature points on the virtual guide, the one or more additional feature points including high-contrast spots, corners, blobs, t-junctions, curves, edges, markers, shapes, objects, colors, textures, patterns, images, fluorescent regions, QR-codes, or combinations thereof;
software executing on a computer readable medium for rendering the virtual guide in the mixed reality device;
software executing on a computer readable medium for identifying and maintaining a superimposition between at least some of the feature points on the virtual guide and corresponding feature points on the physical guide in the mixed reality device; and
software executing on a computer readable medium for rendering the virtual dental treatment template in the mixed reality device at a predetermined position with respect to the physical guide, the predetermined position with respect to the physical guide corresponding to the predetermined position with respect to the virtual arch, the virtual guide, or a combination thereof.

20. The system according to claim 19, wherein the guiding piece is shaped and has a guide width corresponding to a width of the patient's physical arch, and the corresponding feature points on the physical guide are substantially evenly distributed on the physical guide.

\* \* \* \* \*